US012709513B2

(12) United States Patent
Reinhart

(10) Patent No.: US 12,709,513 B2
(45) Date of Patent: Aug. 18, 2026

(54) HOSE REEL ENCLOSURE SYSTEM

(71) Applicant: NICKOLAS BRANDS, LLC, Findlay, OH (US)

(72) Inventor: Nickolas Reinhart, Sarasota, FL (US)

(73) Assignee: Agna, LLC, Sarasota, FL (US)

( * ) Notice: Subject to any disclaimer, the term of this patent is extended or adjusted under 35 U.S.C. 154(b) by 159 days.

(21) Appl. No.: 18/486,455

(22) Filed: Oct. 13, 2023

(65) Prior Publication Data

US 2024/0124264 A1 Apr. 18, 2024

Related U.S. Application Data

(60) Provisional application No. 63/415,812, filed on Oct. 13, 2022, provisional application No. 63/415,857, filed on Oct. 13, 2022, provisional application No. 63/415,838, filed on Oct. 13, 2022, provisional application No. 63/415,798, filed on Oct. 13, 2022.

(51) Int. Cl.

| | |
|---|---|
| ***B65H 75/44*** | (2006.01) |
| ***B65H 75/40*** | (2006.01) |
| ***F16L 3/01*** | (2006.01) |
| ***F16L 33/24*** | (2006.01) |
| ***F16L 37/12*** | (2006.01) |
| ***F16L 37/53*** | (2006.01) |

(52) U.S. Cl.

CPC ......... *B65H 75/4478* (2013.01); *B65H 75/40* (2013.01); *B65H 75/4402* (2013.01); *B65H 75/4407* (2013.01); *B65H 75/4471* (2013.01); *F16L 3/012* (2013.01); *F16L 33/24* (2013.01); *F16L 37/1225* (2013.01); *F16L 37/53* (2013.01); *B65H 75/4405* (2013.01); *B65H 2701/33* (2013.01); *Y10T 137/6954* (2015.04)

(58) Field of Classification Search

None

See application file for complete search history.

(56) References Cited

U.S. PATENT DOCUMENTS

| | | | | |
|---|---|---|---|---|
| 4,137,939 | A | 2/1979 | Chow | |
| 4,506,698 | A | 3/1985 | Garcia et al. | |
| 5,951,063 | A | 9/1999 | Szabo | |
| 6,050,291 | A * | 4/2000 | Whitehead ............. | B65H 75/40 137/355.16 |
| 6,338,360 | B2 | 1/2002 | Spear et al. | |
| 6,591,858 | B2 | 7/2003 | Peterson | |
| 6,976,649 | B2 | 12/2005 | Tisbo et al. | |
| 7,377,289 | B1 * | 5/2008 | English ............. | B65H 75/4471 137/355.2 |
| 8,336,800 | B1 | 12/2012 | Lopez | |
| 8,408,604 | B2 | 4/2013 | Yamada et al. | |
| D707,108 | S | 6/2014 | Fischer, Jr. et al. | |
| 8,801,047 | B2 | 8/2014 | Phillips et al. | |
| 9,010,357 | B2 | 4/2015 | Vogler et al. | |

(Continued)

*Primary Examiner* — William A. Rivera

(74) *Attorney, Agent, or Firm* — Jacob M. Ward; Ward Law Office LLC

(57) ABSTRACT

The present disclosure provides a hose reel enclosure for a hose reel. The hose reel enclosure can include a unitary housing, a hose reel assembly, and a hose guide. The unitary housing can include lateral supports. The hose reel assembly can be disposed within the unitary housing and can be configured to receive the hose. The hose guide can be disposed within the unitary housing and configured to receive a free end of the hose.

20 Claims, 9 Drawing Sheets

(56) References Cited

U.S. PATENT DOCUMENTS

| | | | | |
|---|---|---|---|---|
| D734,656 | S | 7/2015 | Blaszczak et al. | |
| 9,567,187 | B2 | 2/2017 | Arcati | |
| 9,574,689 | B2 | 2/2017 | Phillips et al. | |
| 9,783,389 | B2 | 10/2017 | Blaszczak et al. | |
| 9,796,558 | B2 | 10/2017 | Blaszczak et al. | |
| 9,821,981 | B2 | 11/2017 | Blaszczak et al. | |
| D805,371 | S | 12/2017 | Thuma et al. | |
| D817,156 | S | 5/2018 | Thuma et al. | |
| 10,556,771 | B2 | 2/2020 | Blaszczak et al. | |
| 11,027,942 | B2 | 6/2021 | Blaszczak et al. | |
| 12,007,053 | B2 | 6/2024 | Rydin et al. | |
| 2003/0034417 | A1* | 2/2003 | Tisbo | B65H 75/40 242/395 |
| 2004/0046078 | A1* | 3/2004 | Moon | B65H 75/4471 242/390.8 |
| 2005/0017117 | A1* | 1/2005 | Moon | B65H 75/4471 242/390.8 |
| 2006/0049295 | A1 | 3/2006 | English et al. | |
| 2006/0144986 | A1 | 7/2006 | Tsai | |
| 2007/0045502 | A1* | 3/2007 | Rosine | B65H 75/4463 248/349.1 |
| 2007/0114319 | A1* | 5/2007 | Anderson | B65H 75/4407 242/395 |
| 2007/0144584 | A1* | 6/2007 | Hatcher | B65H 75/4471 137/355.26 |
| 2009/0121067 | A1 | 5/2009 | Arcati et al. | |
| 2010/0155520 | A1* | 6/2010 | Whitehead | B65H 75/40 242/395.1 |
| 2012/0291882 | A1* | 11/2012 | Vogler | B65H 75/40 137/355.2 |
| 2013/0056094 | A1* | 3/2013 | Phillips | B65H 75/446 137/355.26 |
| 2013/0140392 | A1* | 6/2013 | Blaszczak | B65H 75/4407 242/397.4 |
| 2017/0210590 | A1* | 7/2017 | Kopp | B65H 75/403 |
| 2021/0372550 | A1 | 12/2021 | Lanterman et al. | |
| 2024/0125419 | A1* | 4/2024 | Reinhart | B65H 75/4478 |

* cited by examiner

HOSE REEL ENCLOSURE SYSTEM

CROSS-REFERENCE TO RELATED APPLICATIONS

This application claims the benefit of U.S. Provisional Application No. 63/415,812, filed on Oct. 13, 2022, U.S. Provisional Application No. 63/415,838, filed on Oct. 13, 2022, U.S. Provisional Application No. 63/415,857, filed on Oct. 13, 2022, and U.S. Provisional Application No. 63/415,798, filed on Oct. 13, 2022. The entire disclosures of the above applications are incorporated herein by reference.

FIELD

The present technology relates to hose reel enclosures for flexible water hoses, such as garden and air hoses.

INTRODUCTION

This section provides background information related to the present disclosure which is not necessarily prior art.

Portable hose dispensers for handling and storage of flexible water hoses, such as garden and air hoses, have gained wide public acceptance. While the construction of hose dispensers is quite varied, they are primarily constructed of molded plastic components having a centrally disposed rotatable spool or reel for storing the flexible hose, and a frame for supporting the spool. The hose can be used and stored on the rotatable spool, which can allow the hose to be easily removed from the spool and returned thereto. Further examples of portable hose dispensers included embodiments configured or mounted on carts.

Although such dispensers have become widespread in use because of their neat and orderly storage capabilities, they do have their drawbacks. A hose stored on such a reel is open to the environment. Often the hose is made from rubber or similar materials that can become stiff or brittle and can break when subjected to low temperature extremes. This becomes more of a problem as the hose ages. In addition, ultraviolet radiation (e.g., sunlight) has been known to accelerate degradation of certain hose materials after prolonged exposure thereto.

Hose reel dispensers may also be considered by some to be bulky and unsightly. As such, some users may be inclined to constantly remove the hose reel dispenser from the location where it is in use, particularly from the front of a house. This can be exaggerated when, for example, the dispenser becomes dirty, muddy, and the like. Given that most hose reel carts are designed for use in and around garden and lawn areas, it can be expected for these dispensers to become dirty and unsightly.

Accordingly, there exists a need for a hose reel storage device that permits a hose to be taken up and dispensed readily and is aesthetically pleasing. That is, such a hose reel storage device can be used to "hide-away" the hose stored therein when not in use and desirably provide a protective, outwardly aesthetically pleasing appearance.

SUMMARY

In concordance with the instant disclosure, a hose reel storage device that permits a hose to be taken up and dispensed readily and is aesthetically pleasing, has surprisingly been discovered.

The present disclosure provides a hose reel enclosure for a hose reel. The hose reel enclosure can include a unitary housing, a hose reel assembly, and a hose guide. The unitary housing can include lateral supports. The hose reel assembly can be disposed within the unitary housing and can be configured to receive the hose. The hose guide can be disposed within the unitary housing and configured to receive a free end of the hose.

The present disclosure further provides a certain embodiment of a hose reel enclosure for a hose reel. The hose reel enclosure can include a unitary housing, a hose reel assembly, a hose guide, and an inlet collar. The unitary housing can include a front wall, a groove, lateral supports, and feet. The front wall can include an opening configured to receive the hose. The lateral supports can be disposed within the groove and be integral to the unitary housing. The lateral supports can be disposed on the exterior of the unitary housing. The hose reel assembly can be disposed within the unitary housing. The hose reel assembly can include a rotary union and a crank. The rotary union can be configured to receive the hose. The crank can be disposed adjacent to the unitary housing and can be configured to rotate the rotary union. The hose guide can be disposed within the unitary housing and configured to receive a free end of the hose. The inlet collar can be disposed within the unitary housing for coupling with another hose.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
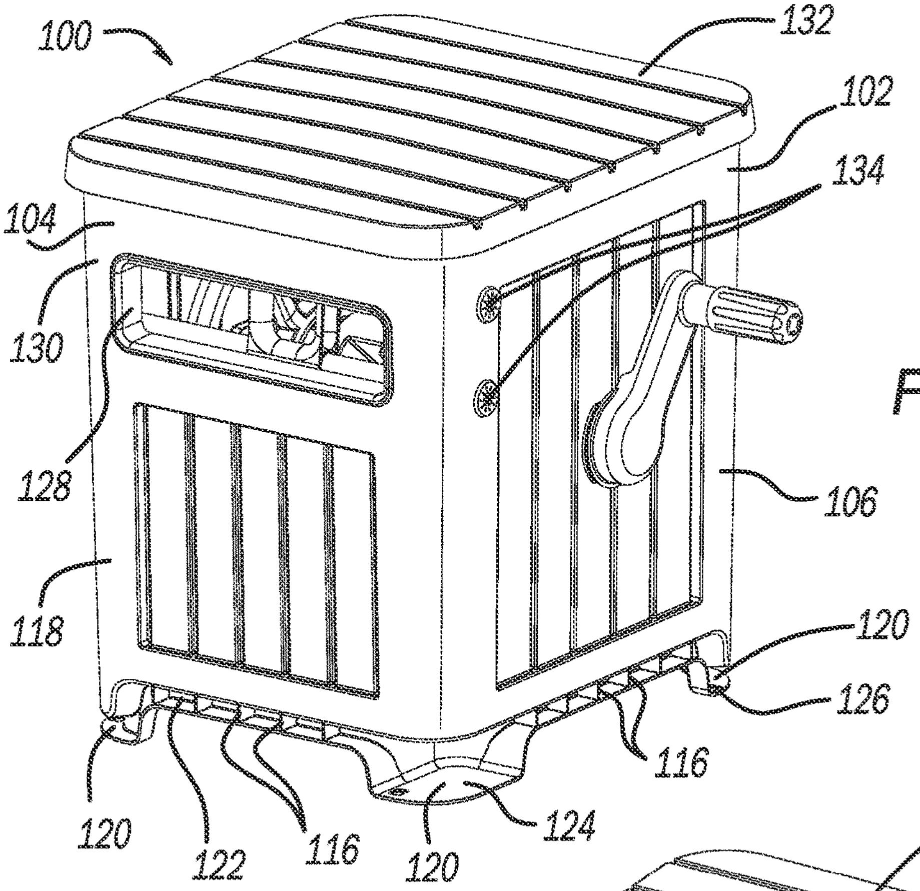
FIG. 1 is a front, top perspective of the hose reel enclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a hose reel enclosure 100 for a hose shown generally in FIGS. 1-16. The hose reel enclosure 100 can include a unitary housing 102, a hose guide 200, and a hose reel assembly 300. Advantageously, the hose reel enclosure 100 can allow the hose 101 to permanently remain in the hose reel enclosure 100 for storage. The hose 101 can remain in the hose reel enclosure 100 during inclement weather and the hose reel enclosure 100 can provide protection from the elements. Further, the hose reel enclosure 100 can militate against hose degradation from UV light by blocking sunlight from contacting the hose 101.

Figure 2:
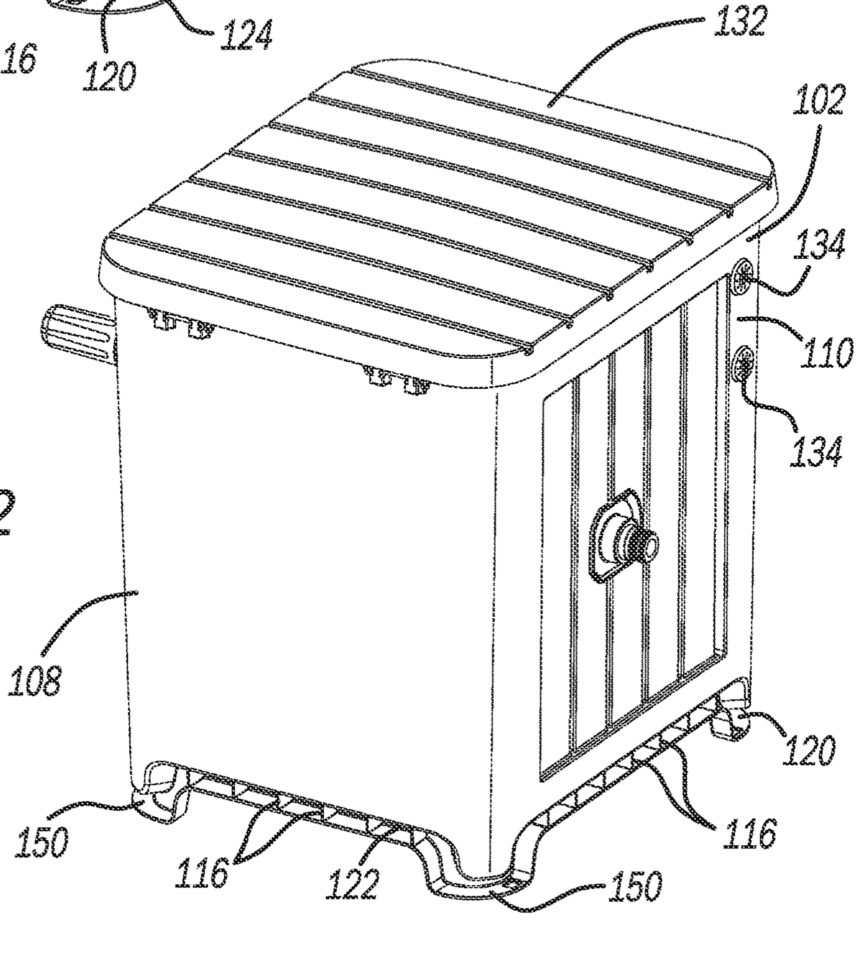
FIG. 2 is a rear, top perspective of thereof.

The enclosure 100 can be formed from a solid material. The solid material can allow for the enclosure 100 to be stable and durable as it is weathered from the outdoors. As non-limiting examples, the enclosure 100 can be formed from polypropylene, high density polyethylene (HDPE), and/or polyethylene terephthalate (PET). One of ordinary skill in the art can select other suitable materials for forming the enclosure 100 within the scope of the present disclosure. In a specific example, and as shown in FIGS. 1-2, the unitary housing 102 can be contiguous having an uninterrupted surface. In a more specific example, the unitary housing 102 can be injection molded, producing one continuous unitary housing 102 in which each of the components is formed of the same material. The unitary housing 102 can be injection molded and formed by a single piece of plastic. A skilled artisan can select a suitable manufacturing means for the unitary housing 102, as desired.

Figure 6:
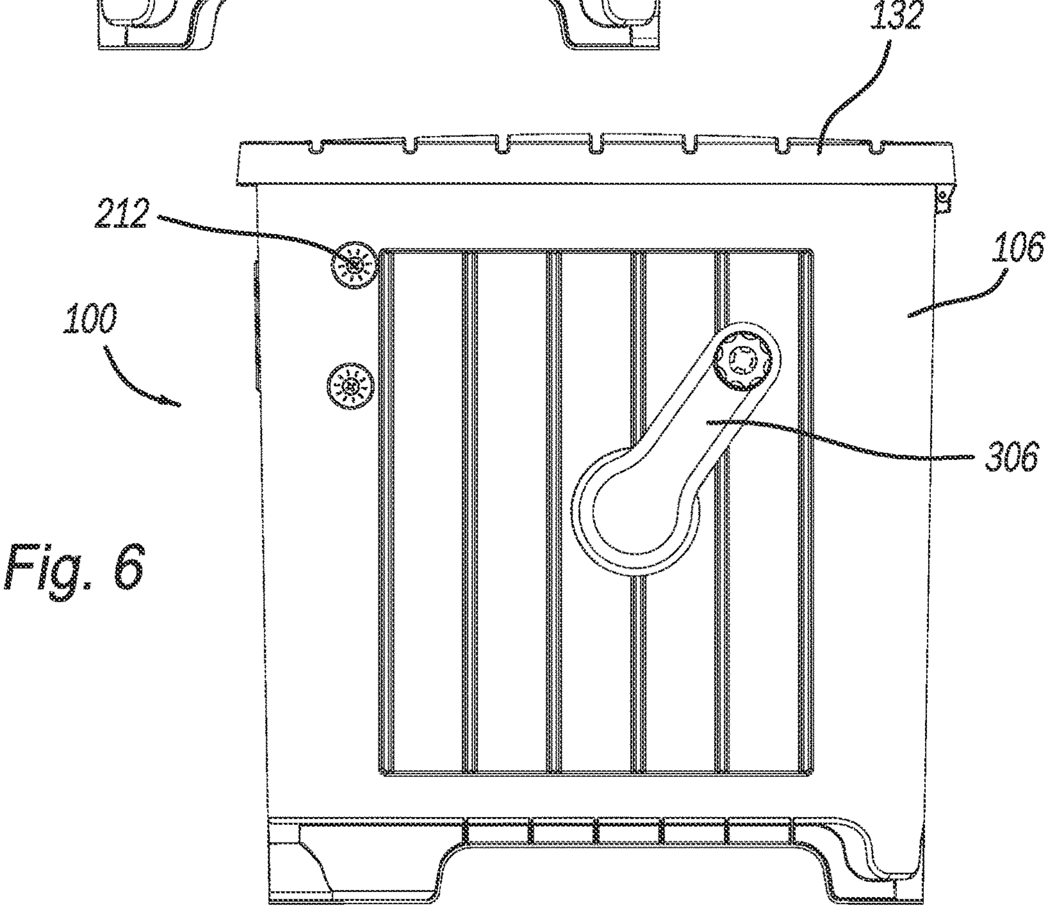
FIG. 6 is a right-side elevational view thereof.
Figure 7:
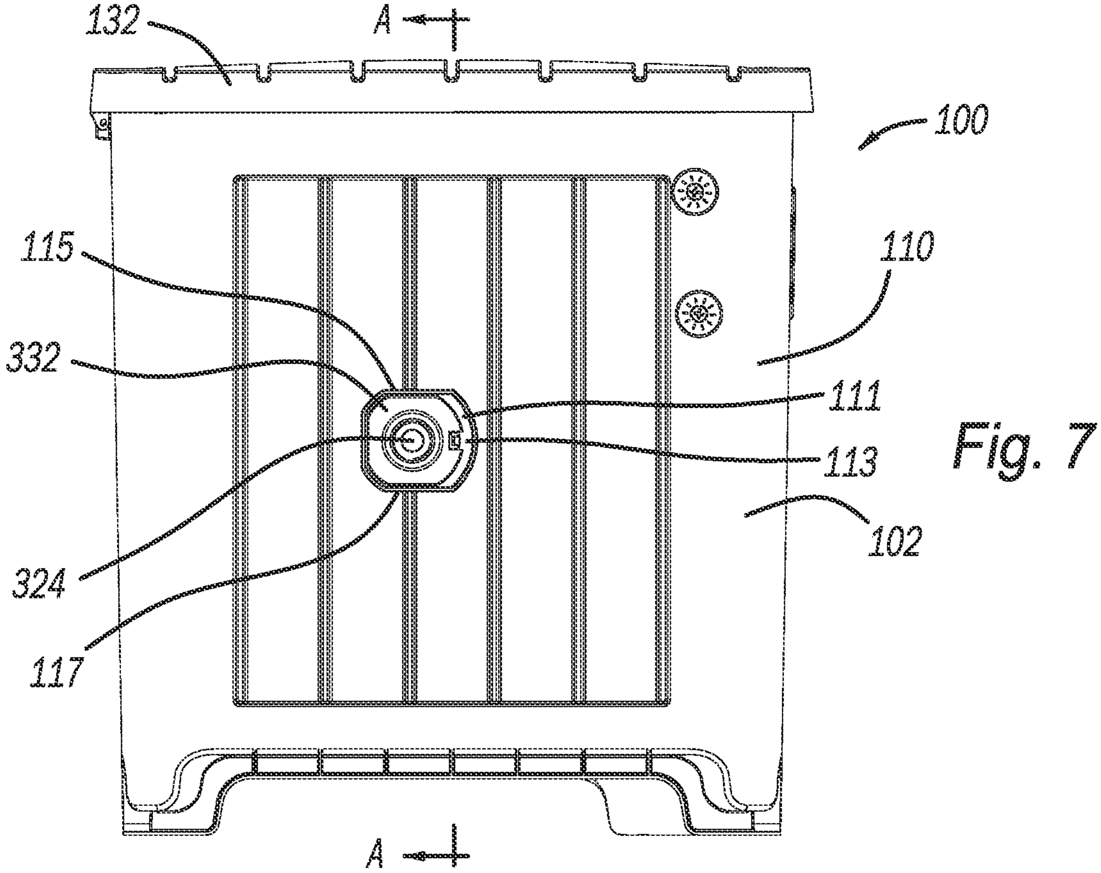
FIG. 7 is a left-side elevational view thereof.
Figure 8:
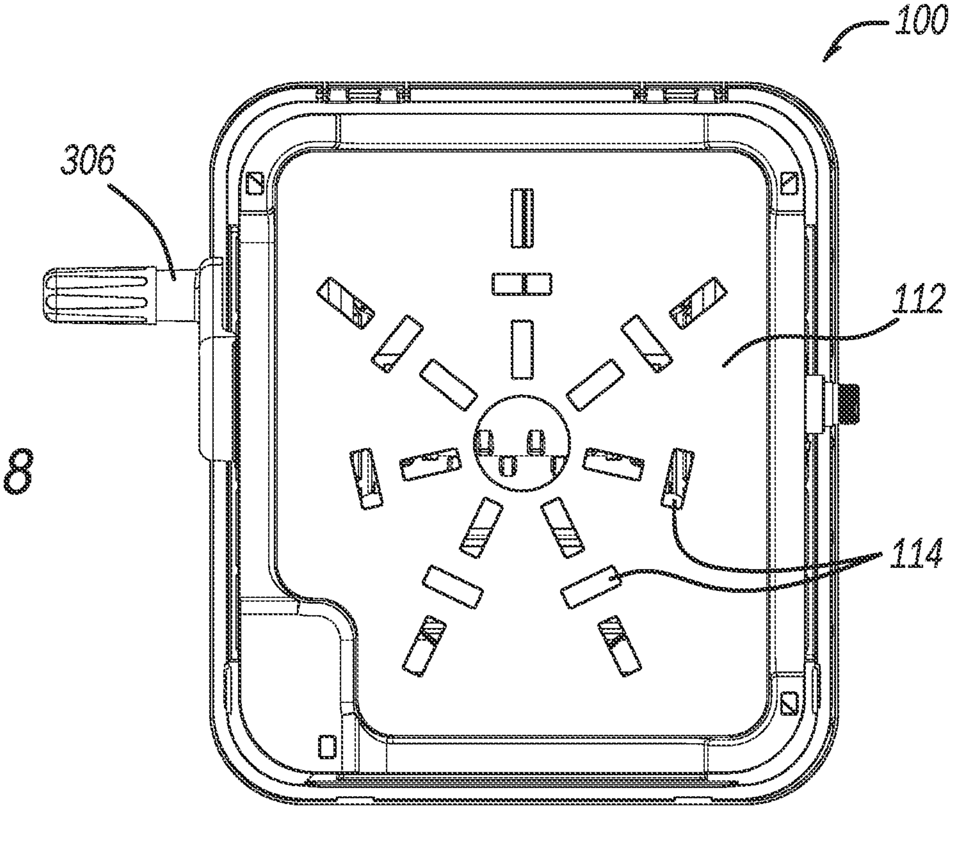
FIG. 8 is a bottom plan view thereof.

As shown in FIGS. 1-8, the unitary housing 102 can include a front wall 104, a first sidewall 106, a rear wall 108, and a second sidewall 110. The front wall 104 can be disposed adjacent to the first sidewall 106 and the second sidewall 110. The first sidewall 106 can be disposed adjacent to the front wall 104 and the rear wall 108. The rear wall 108 can be disposed adjacent to the first sidewall 106 and the second sidewall 110. The second sidewall 110 can be disposed adjacent to the front wall 104 and the rear wall 108. The front wall 104 can be disposed opposite the rear wall 108. As described above, the front wall 104, the first sidewall 106, the rear wall 108, and the second sidewall 110 can be formed as a unitary piece. Further, the unitary housing 102 can include a bottom wall 112 disposed adjacent to the front wall 104, first sidewall 106, the rear wall 108, and the second sidewall 110. In certain embodiments, the bottom wall 112 can include drainage holes 114, as shown in FIG. 8, to allow for any water from the hose 101 or rainwater that has entered the hose reel enclosure 100 to drain from the unitary housing 102. Advantageously, this can militate against water accumulating in the bottom of the unitary housing 102.

With reference to FIGS. 1-2, the unitary housing 102 can include lateral supports 116, which, in certain embodiments, are integrally formed with the unitary housing 102. The lateral supports 116 can be disposed on the front wall 104, the first sidewall 106, the rear wall 108, the second sidewall 110, and any combination thereof. The lateral supports 116 can be disposed along a bottom portion 118 of the unitary housing 102. In certain instances, the lateral supports 116 can be disposed on the exterior of the unitary housing 102. Alternatively, the lateral supports 116 can be disposed on both the interior and the exterior of the unitary housing 102. Advantageously, the lateral supports 116 can allow for the unitary housing 102 to be constructed or formed as a single unit without the need for additional structural support. The lateral supports 116 can militate against the hose reel enclosure 100 sagging, bending, or torquing as pressure from movement or weight is applied to the enclosure 100, including weight of the hose 101 contained therein, forces exerted when moving the hose reel enclosure 100, as well as when winding/unwinding the hose 101 therefrom. Thus, the lateral supports 116 can improve the durability and stability of the enclosure 100.

Figure 3:
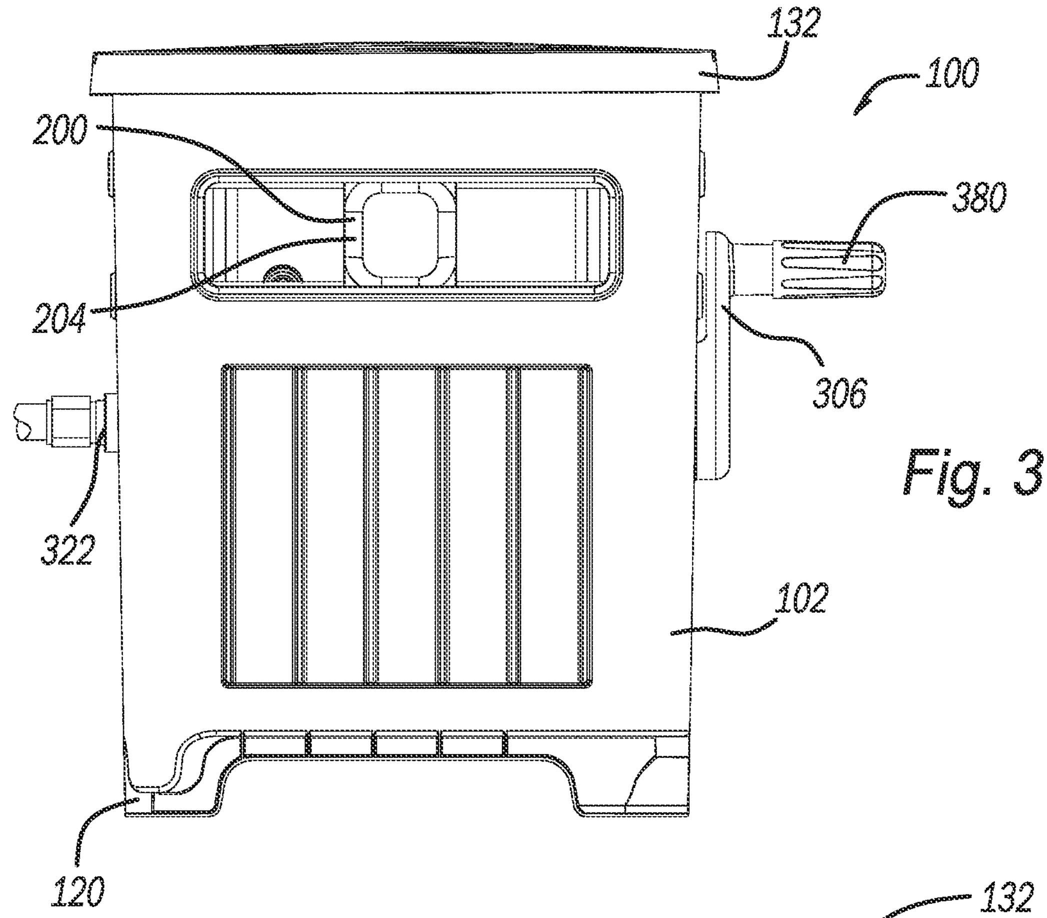
FIG. 3 is a front elevational view thereof.
Figure 4:
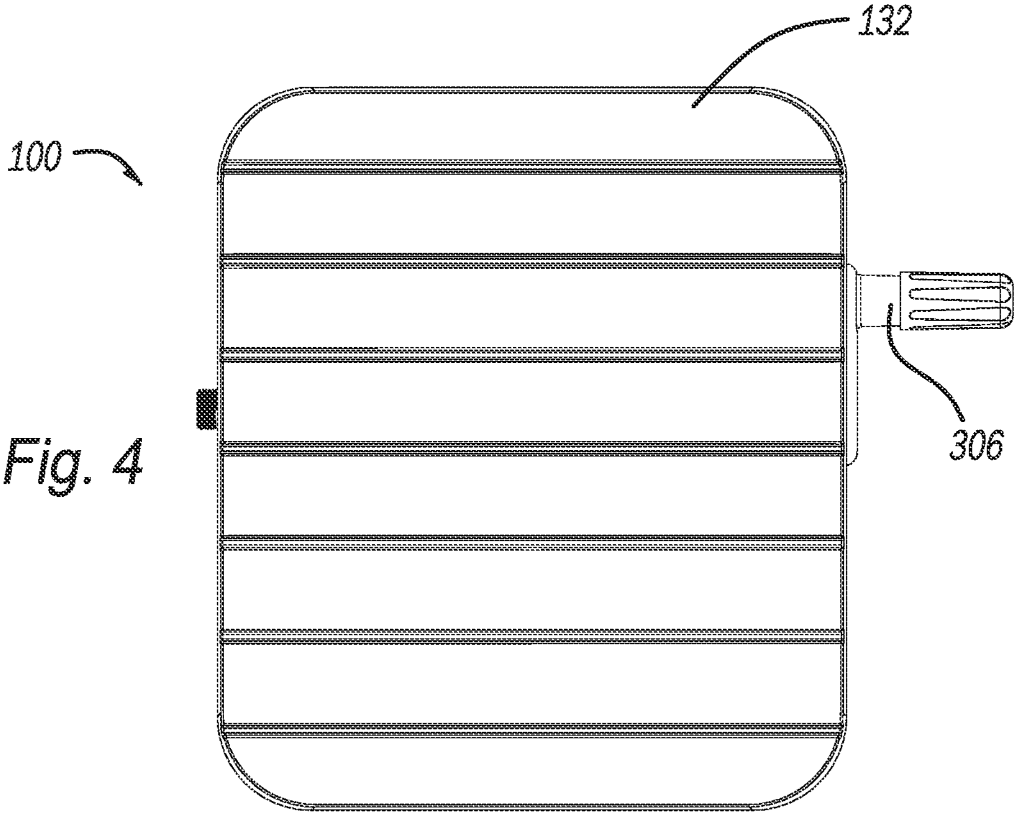
FIG. 4 is a top plan view thereof.

With reference to FIGS. 1-3, the unitary housing 102 can include feet 120. The feet 120 can be positioned at junctions or corners located below the front wall 104, the sidewalls 106, 110, and the rear wall 108, where the feet 120 do not extend beyond the perimeter of the unitary housing 102. The unitary housing 102 can further include a groove 122 disposed adjacent to the feet 120. The lateral supports 116 can be disposed between a first foot 124 and a second foot 126 and within the groove 122. The lateral supports 116 disposed within the groove 122 can provide structural support to not just the unitary housing 102 as whole, but also to each respective individual wall 104, 106, 108, 110 of the unitary housing 102 associated with the lateral supports 116.

Each of the front wall 104, the first sidewall 106, the rear wall 108, and the second sidewall 110 can include any number of lateral supports 116. As a non-limiting example, and as shown in FIGS. 1-2, the first sidewall 106 can include up to six lateral supports 116, the front wall 104 can include up to five lateral supports 116, the second sidewall 110 can include up to seven lateral supports 116, and the rear wall 108 can include up to six lateral supports 116, as desired. Alternatively, each of the front wall 104, the first sidewall 106, the rear wall 108, and the second sidewall 110 can include an equal number of lateral supports 116. A skilled artisan can select a suitable number of lateral supports 116 necessary to provide adequate structural support to the unitary housing 102.

It should be appreciated that the front wall 104 can include an opening 128, as shown in FIG. 1. The opening 128 can be configured to receive the hose 101 therethrough. The opening 128 can be disposed on a top portion 130 of the unitary housing 102. The opening 128 can be shaped to allow for the hose 101 to be wound and unwound from within the unitary housing 102 without snagging on the opening 128. Further, the opening 128 can be sized to allow hoses 101 of various diameters to be stored into the unitary housing 102. A skilled artisan can select a suitable size and shape for the opening 128 within the scope of the present disclosure.

Figure 5:
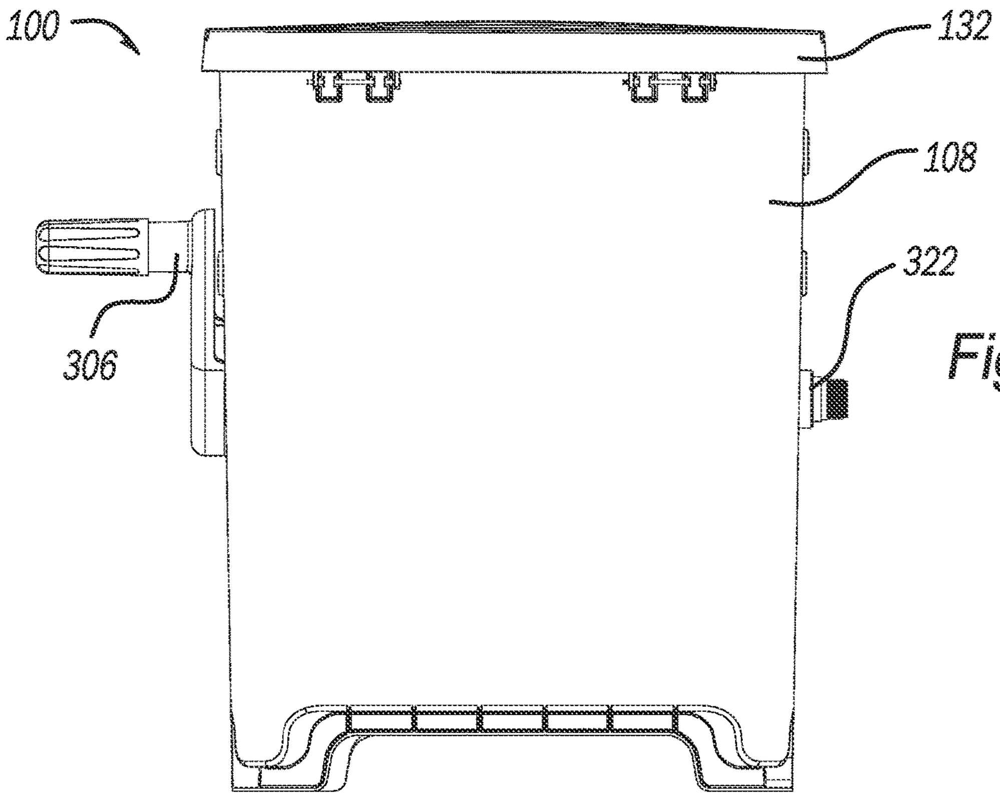
FIG. 5 is a rear elevational view thereof.

With reference to FIG. 5, the hose reel enclosure 100 can further include a lid 132. The lid 132 can be hingedly connected to the unitary housing 102. Alternatively, the lid 132 can be attached to the unitary housing 102 using a snap feature. As such, the lid 132 can be formed separately from the unitary housing 102. The lid 132 can allow for access to the interior of the unitary housing 102. Desirably, the lid 132 can militate against debris and unwanted water from entering the hose reel enclosure 100. A skilled artisan can select a suitable means for attaching the lid 132 to the unitary housing 102.

Figure 10:
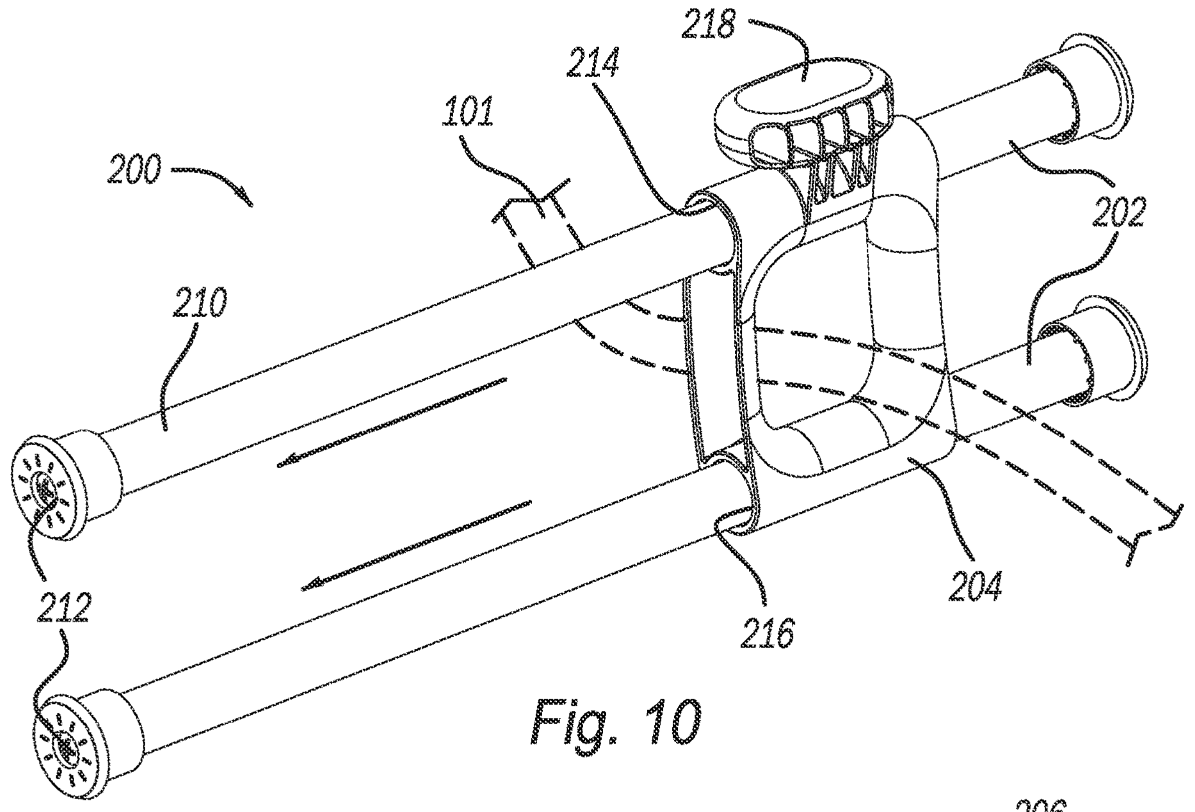
FIG. 10 is a top perspective view of a hose guide.
Figure 11:
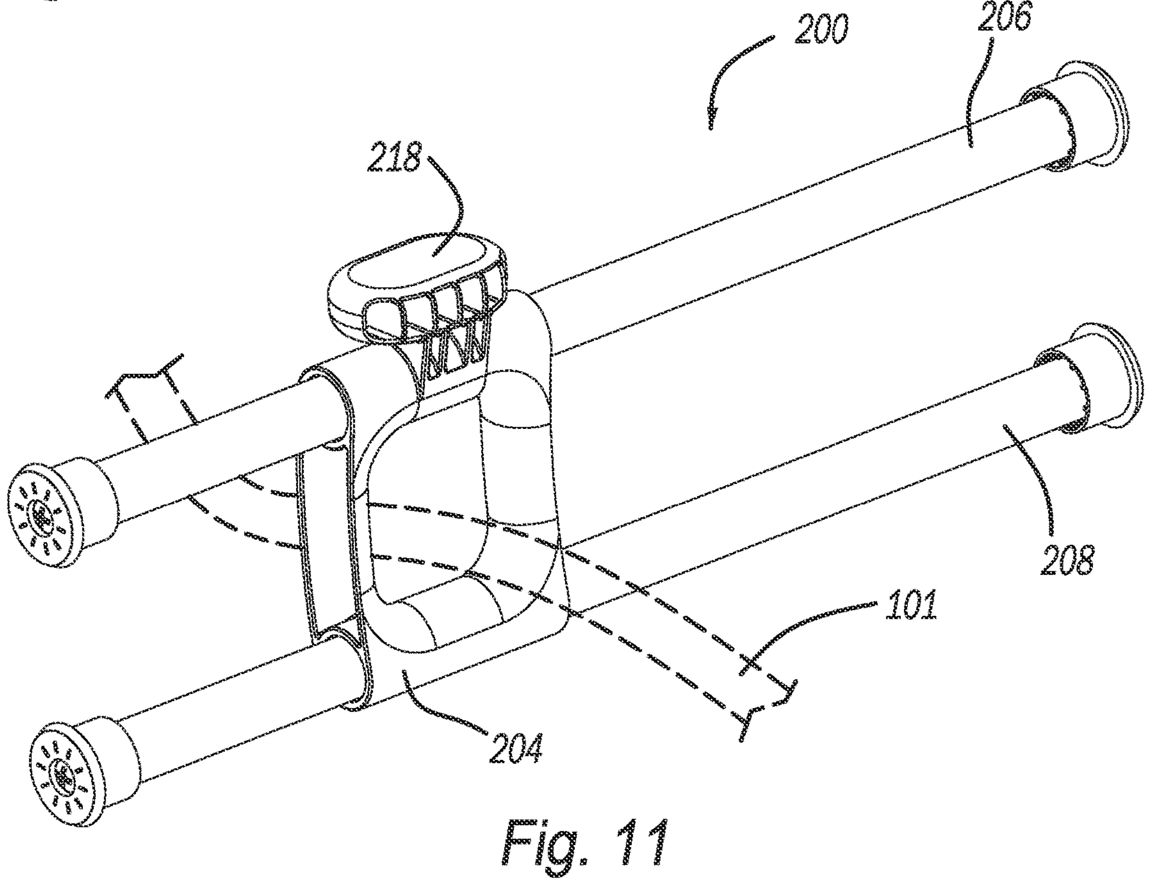
FIG. 11 is top perspective view thereof illustrating movement of a hose guide member of the hose guide from a position shown in FIG. 10.
Figure 12:
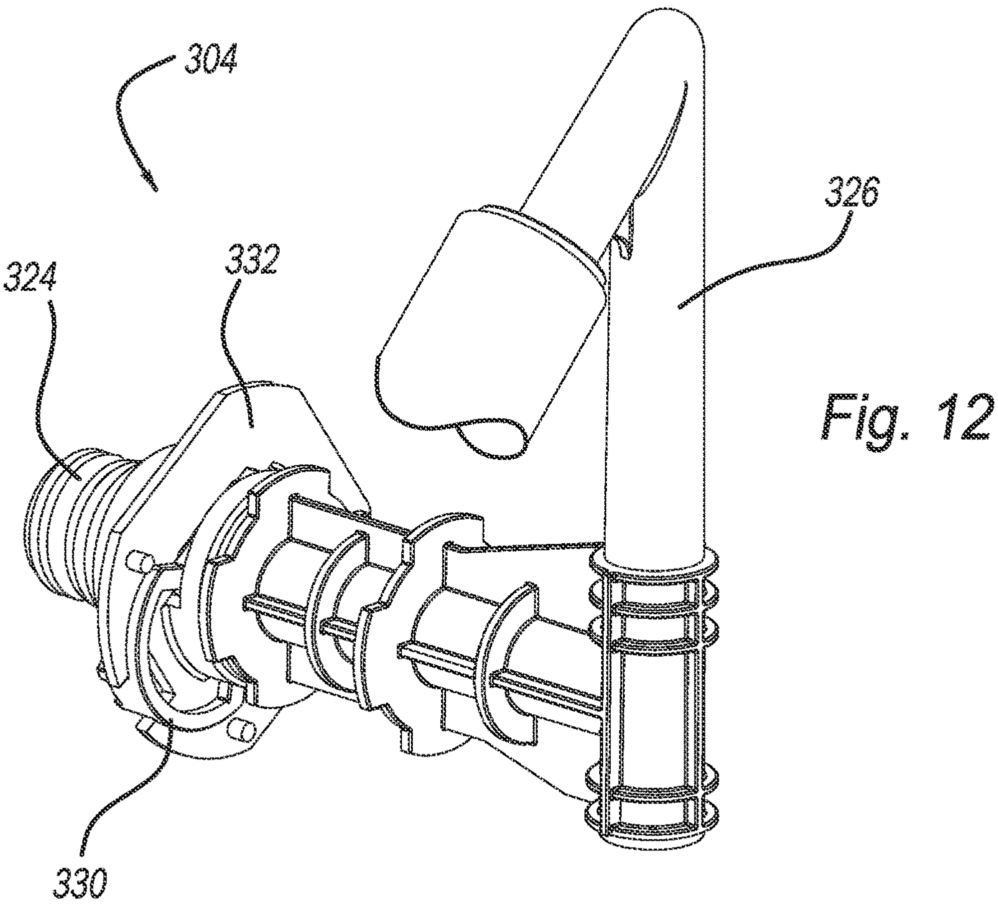
FIG. 12 is a top perspective view of a rotary union and an inlet collar.

With reference to FIGS. 10-11, the hose guide 200 can include a pair of travel bars 202 and a guide member 204. The hose guide 200 can be formed from a solid material. The solid material can allow for the hose guide 200 to be stable and durable as it is weathered from the outdoors. Advantageously, the hose guide 200 can provide a solid structure for the hose 101 to move through while the hose reel enclosure 100 is in use. The hose guide 200 can militate against the against the hose 101 becoming damaged or tangled while it is wound into and out of the hose reel enclosure 100.

With reference to FIGS. 1 and 6, the first sidewall 106 and the second sidewall 110 each include a pair of apertures 134 configured to receive the pair of travel bars 202 including a first travel bar 206 and a second travel bar 208. The pair of apertures 134 can be disposed such that the first travel bar 206 and the second travel bar 208 are parallel and span the length of the front wall 104 and as such, the distance between the first sidewall 106 and the second sidewall 110. The pair of apertures 134 can be vertically displaced to allow for the first travel bar 206 and the second travel bar 208 to be spaced apart from each other. Each aperture 134 can receive a terminus 210 of one travel bar 206, 208 of the pair of travel bars 202 such that each travel bar 206, 208 is installed into the unitary housing 102.

It should be noted that in certain embodiments, the first travel bar 206 and the second travel bar 208 can be free standing, as shown in FIGS. 10-11. Each of the first travel bar 206 and the second travel bar 208 can include a cap 212 disposed at each terminus 210. Desirably, the cap 212 can militate against debris and insects from entering the terminus 210 of the travel bars 206, 208. The first travel bar 206 and the second travel bar 208 can be coupled to the hose reel enclosure 100 using the respective caps 212, as shown in FIGS. 1-2 and 6. In this way, the respective ends of the first travel bar 206 and the second travel bar 208 can be positioned through apertures 134 in the hose reel enclosure 100 and the caps 212 can be used as fasteners.

With reference again to FIGS. 10-11, the pair of travel bars 202 can be formed separately from a wall of the hose reel enclosure 100. Further, the pair of travel bars 202 can be spaced apart from and parallel to the opening 128 of the hose reel enclosure 100. Advantageously, the pair of travel bars 202 being formed separately from the sidewalls 106, 110 of the enclosure 100 can allow for easy repair should one of the travel bars 206, 208 break or become worn. Further, the ability to repair one of the travel bars 206, 208 without requiring other parts to be replaced can keep the cost of maintaining the enclosure low and militate against the replacement of the entire enclosure due to one part breaking.

With continued reference to FIGS. 10-11, the guide member 204 can include a first hole 214 for receiving the first travel bar 206 therethrough and a second hole 216 for receiving the second travel bar 208 therethrough. The guide member 204 can therefore be slidably disposed on the pair of travel bars 202 and slide freely along the pair of travel bars 202. Advantageously, the free movement can allow for the guide member 204 to move with the hose 101 as it is wound and unwound from the enclosure 100. Thus, the free movement along the pair of travel bars 202 can provide for smoother hose 101 raveling and unraveling and can facilitate even distribution of the hose 101 when reeling the hose 101 back into the hose reel enclosure 100.

As shown in FIGS. 10-11, the guide member 204 can include a handle 218. The handle 218 can extend from a remainder of the guide member 204. The handle 218 can be ergonomically shaped to allow the user to grasp the handle 218 and allow for the user to slide the guide member 204 across the travel bars 202. Advantageously, the handle 218 can allow the guide member 204 to be manually moved or held stationary in a specific place along the pair of travel bars 202 during use. Advantageously, the guide member 204 can provide a solid structure for the hose 101 to move through while the hose reel enclosure 100 is in use. The guide member 204, coupled with movement by the user grasping the handle 218, can be used direct the hose 101 as it is wound and unwound. In this way, the hose guide 200 can militate against the hose 101 becoming damaged or tangled while it is wound into and out of the hose reel enclosure 100.

As a non-limiting examples, the guide member 204 and travel bars 202 can be formed from polypropylene, high density polyethylene (HDPE), and/or polyethylene terephthalate (PET). One of ordinary skill in the art can select other suitable materials for forming the guide member 204 and travel bars 202 within the scope of the present disclosure.

In a specific example, and as shown in FIGS. 10-11, the guide member 204 can be contiguous and have an uninterrupted surface. Additionally, the each of the first travel bar 206 and the second travel bar 208 can be contiguous and have an uninterrupted surface. In a more specific example, the guide member 204 can be injection molded, producing one continuous guide member 204 in which each of the components, including the handle 218 is formed of the same material. To this point, the guide member 204 and the travel bars 202 can be injection molded separately.

Figure 9:
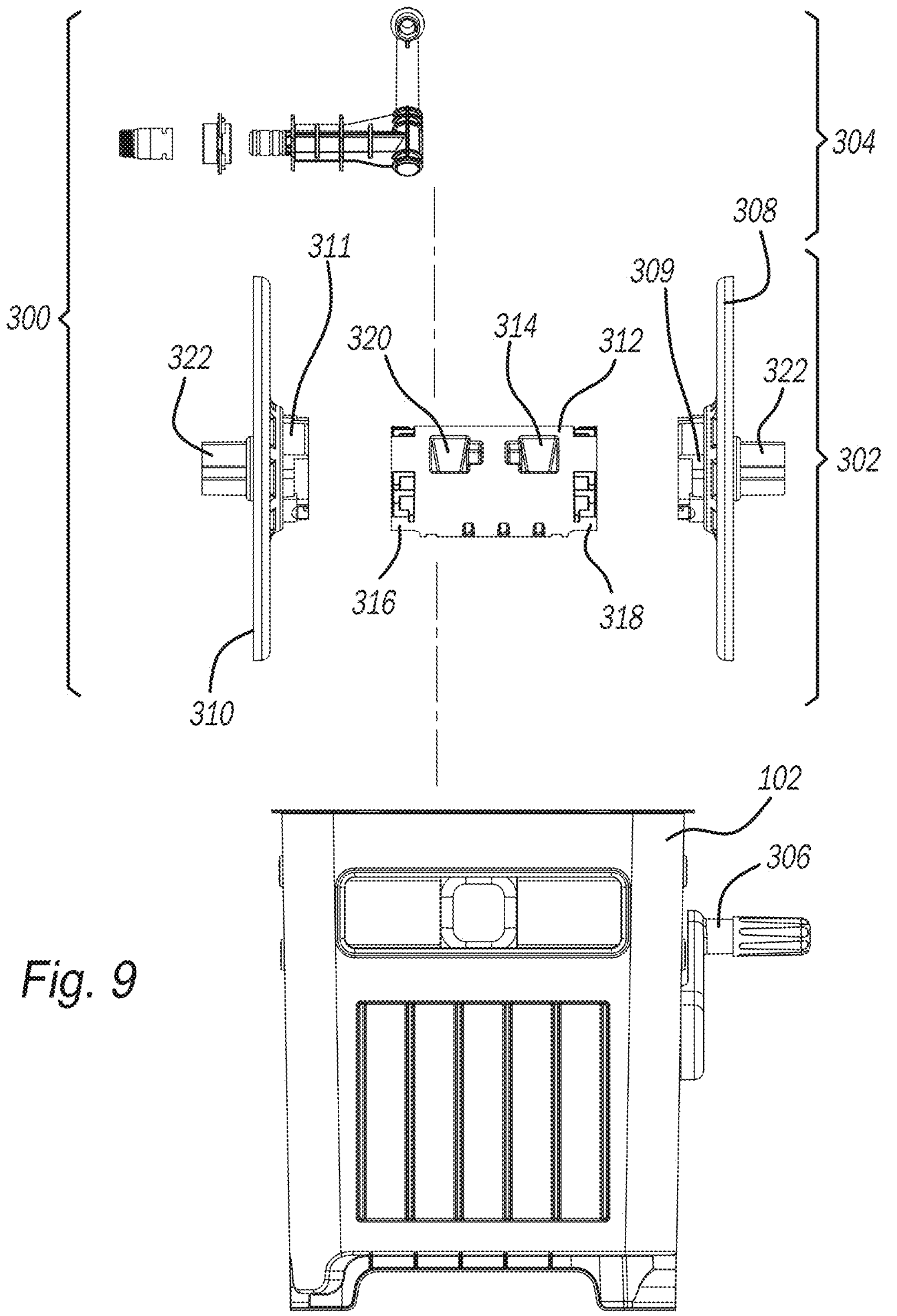
FIG. 9 is an exploded view thereof.

As shown in FIG. 9, the hose reel enclosure 100 can include a hose reel assembly 300. The hose reel assembly 300 can be disposed within the unitary housing 102. The hose reel assembly 300 can include a spool 302, a rotary union 304, and a crank 306. Advantageously, the hose reel assembly 300 can allow for the hose 101 to be wound and unwound from the hose reel enclosure 100 by rotating the crank 306 coupled to the spool 302 instead of repeatedly looping/unlooping the hose 101 about the spool 302.

The spool 302 can include a first flange 308, a second flange 310, and a barrel 312. The first flange 308 can be disposed at a first edge 316 of the barrel 312 and the second flange 310 can be disposed at a second edge 318 of the barrel 312. In operation, the first flange 308 and the second flange 310 can militate against the hose 101 falling off the first edge 316 and second edge 318 of barrel 312. Advantageously, the first flange 308 and the second flange 310 can allow for the user to manually rotate the hose reel assembly 300 from within the unitary housing 102 without using the crank 306 disposed on the exterior of the unitary housing 102. The spool 302 can have a hollow interior to allow for a portion of the rotary union 304 to be housed within a portion of the spool 302. In particular, the barrel 312 of the spool 302 can include one or more passages 314, 320 to allow for a portion of the rotary union 304 to extend out of the barrel 312 of the spool 302.

As shown in FIG. 9, the first flange 308 can include a first bearing assembly 309. The first bearing assembly 309 can aid in coupling the first flange 308 to the barrel 312 of the spool 302 as well as coupling the crank 306 to the spool 302. The first sidewall 106 can include a first aperture 117 that can be configured to receive the first bearing assembly 309. Similarly, the second flange 310 can include a second bearing assembly 311. The second bearing assembly 311 can aid in coupling the second flange 310 to the barrel 312 of the spool 302 as well as coupling the rotary union 304 to the spool 302. The second sidewall 110 can include a second aperture 111 that can be configured to receive the second bearing assembly 311. A portion of the rotary union 304 can be disposed within the spool 302 of the hose reel assembly 300. The spool 302 can allow for the hose 101 to be wound upon and unwound from the hose reel enclosure 100 in an organized fashion, militating against kinks occurring in the hose 101 and reduced water pressure while in use.

Figure 13:
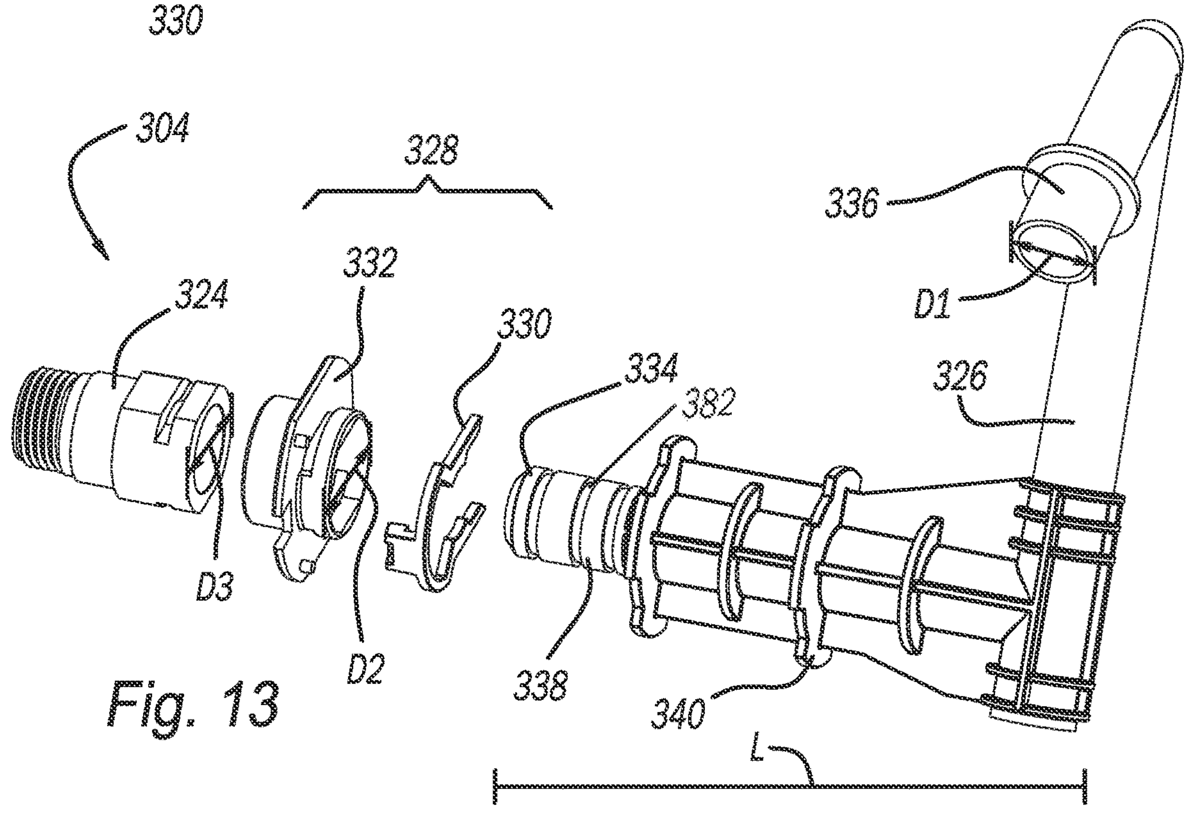
FIG. 13 is an exploded view of the rotary union and the inlet collar assembly of FIG. 12.
Figure 14:
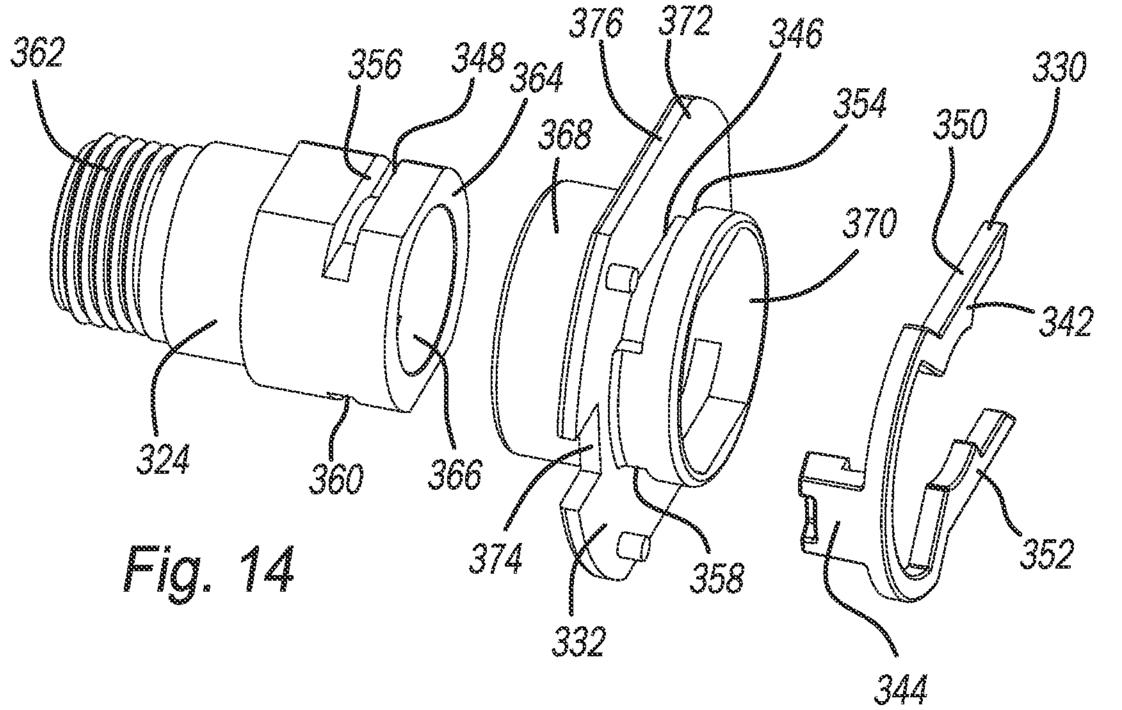
FIG. 14 is a closeup exploded view of the inlet collar assembly of FIG. 13.
Figure 15:
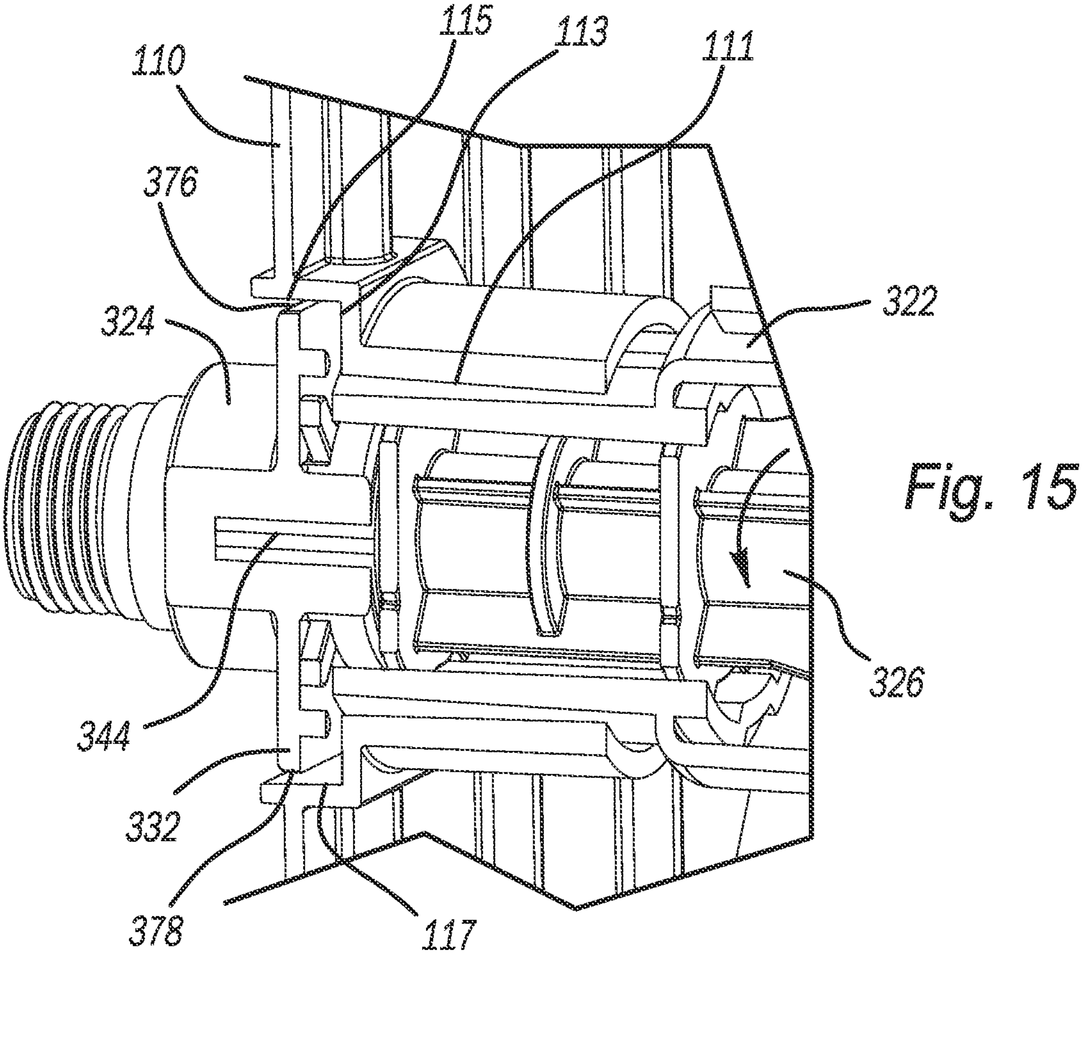
FIG. 15 is a cutaway, cross-sectional, perspective view of the inlet collar assembly positioned with respect to a portion of the hose reel enclosure taken at section line A-A in FIG. 7.
Figure 16:
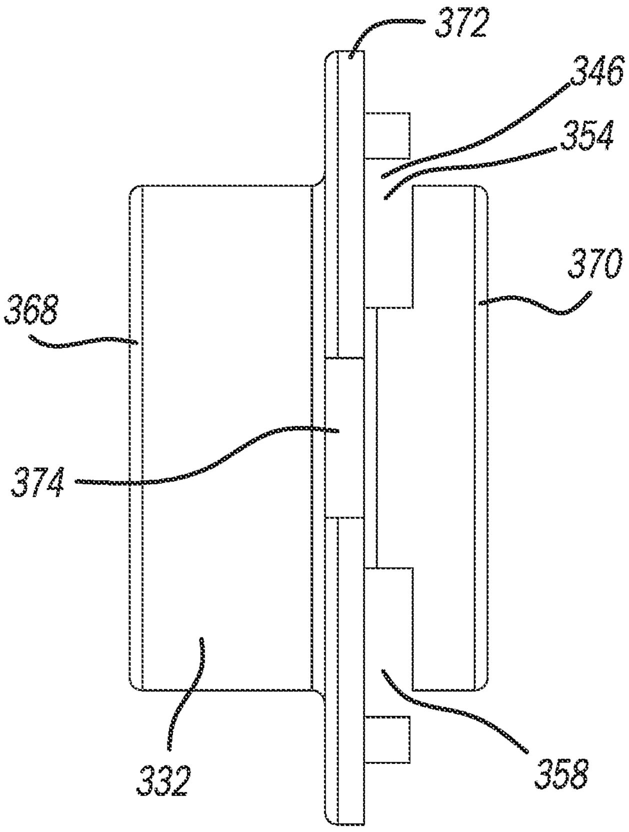
FIG. 16 is a top plan view of the inlet collar.

With reference to FIGS. 12-15, the rotary union 304 can include an inlet member 324, an outlet member 326, and an inlet locking collar assembly 328. The inlet locking collar assembly 328 can include a securing member 330 and a collar 332. The outlet member 326 can include a first terminal 334 and a second terminal 336. The first terminal 334 can rotate within the inlet member 324 due to the rotation of the crank 306 while the inlet member 324 remains stationary and affixed to the fluid source, as shown in FIG. 15. The first terminal 334 can be configured to go through the collar 332 and a portion of the barrel 312 and can be disposed in the inlet member 324.

The second terminal 336 can be configured to be coupled to an end of the hose 101 to be wound on the spool 302. The second terminal 336 can extend through one of the passages 314, 320 of the spool 302 to be disposed outside the spool 302. The second terminal 336 can include a diameter (D1). The second terminal 336 can further include a threaded coupling for attaching to the hose 101. The diameter (D1) can be varied to allow for any hose 101 to attach to the second terminal 336. One of ordinary skill can select a suitable diameter (D1) for the second terminal 336 to allow for use with a variety of hoses 101 within the scope of the present disclosure. The second terminal 336 and the diameter (D1) can be configured to be coupled to a hose 101 using various means, including various fasteners, clamps, fittings, as well as via complementary threaded couplings (not shown). With continued reference to FIG. 13, the outlet member 326 can have a length (L). The length (L) can be varied to allow for the outlet member 326 to rest within the hose reel enclosure 100. To this point, the length (L) of the outlet member 326 can be at least the length required for the outlet member 326 to extend through a portion of the barrel 312 and into the first sidewall 106. One of ordinary skill can select a suitable length (L) for the outlet member 326 within the scope of the present disclosure.

With reference to FIG. 13, the outlet member 326 can have an inner surface that is cylindrical to allow for liquid to flow through the rotary union 304 into the hose 101. For example, the inner surface can form a conduit through the outlet member 326 from the first terminal 334 to the second terminal 336. The outlet member 326 can include gaskets 338 and flanges 340. Desirably, the gaskets 338 can seal with the inlet member 324 as the outlet member 326 rotates. Advantageously, flanges 340 can provide structural support to the outlet member 326 as it is disposed within the hose reel assembly 300 by engaging with the interior of barrel 312 so that the second terminal 336 of outlet member 326 that passes through the barrel 312 is not subjected to various forces or torque. The flanges 340 can also militate against the spool 302 from moving independently from the rotary union 304. One of ordinary skill can select a suitable a suitable number of gaskets 338 and flanges 340 for the outlet member 326 within the scope of the present disclosure.

The securing member 330 can include an arm 342 and a clip 344, as shown in FIG. 14. The arm 342 can be configured to be disposed in a recess 346 of the collar 332 as well as a channel 348 of the inlet member 324, as shown in FIG. 14. In certain embodiments, the securing member 330 can include a first arm 350 and a second arm 352. The first arm 350 can be configured to rest in a first recess 354 of the collar 332 and a first channel 356 of the inlet member 324. The second arm 352 can be configured to rest in a second recess 358 of the collar 332 and a second channel 360 of the inlet member 324. Advantageously, the securing member 330 can secure the outlet member 326 in place within the collar 332 via the first arm 350 being disposed in the first recess 354 and the second arm 352 being disposed in the second recess 358 and inlet member via the first arm 350 being disposed in the first channel 356 and the second arm 352 being disposed in the second channel 360 while allowing the outlet member 326 to rotate freely as a user unwinds or winds a hose 101 relative to the hose reel enclosure 101.

As shown in FIG. 14, the inlet member 324 can include a first end 362, a second end 364, and the channel 348. The first end 362 can be configured to be coupled to a fluid source such as another hose or a water supply line. As shown, the first end 362 can include threading complementary to a fluid source coupling or hookup (not shown) to couple the first end 362 to the fluid source. The second end 364 can be configured to receive the first terminal 334 of the outlet member 326. The first end 362, including the threaded coupling on the first end 362, can be formed of a single material. As a non-limiting example, the first end 362 and the second end 364 can be formed of the same material and, to this point, inlet member 324 can be formed of a single material. Advantageously, forming the inlet member 324, including the first end 362 and the second end 364 of the same material can provide a more durable and structurally sound inlet member 324 by allowing the inlet member to be formed as a unitary piece. To this point, forming the inlet member 324 as a unitary piece can militate against assembled parts breaking off of the inlet member 324. In a non-limiting example, the inlet member 324, including the first end 362 having the treaded coupling and the second end 364 can be formed of plastic therefore militating against the need to additional materials or metals. By forming the threaded coupling of the inlet member 324 of plastic as opposed to metal, rusting and wearing concerns associated with metal threadings are avoided and the life of the inlet member can be extended. The channel 348 can be disposed on the second end 364 and configured to receive the arm 342 of the securing member 330. In certain embodiments, the inlet member 324 can include the first channel 356 and the second channel 360 which cooperate with the collar 332 and securing member 330 as described herein. The first channel 356 can be configured to receive the first arm 350 of the securing member 330 and the second channel 360 can be configured to receive the second arm 352 of the securing member 330.

It should be appreciated that the outlet member 326 can further include a slot 382 disposed at the first terminal 334, as shown in FIG. 13. The first terminal 334 cane be configured to go entirely through the collar 332 and be disposed within the inlet member 324. To this point, as fluid travels thought the rotary union 304, fluid contacts only the inlet member 324 and the outlet member 326, without contacting the collar 332. Further, the first arm 350 and the second arm 352 can rest within or contact the slot 382, where the rotary union 304 is assembled and militate against the outlet member 326 becoming dislodged or uncoupled from the inlet member 324 during use. In this way, the collar 332 and securing member 330 can militate against the inlet member 324 from rotating during use, while allowing the outlet member 326 to freely rotate with the rotation of the spool 302.

With continued reference to FIG. 14, the inlet member 324 can have an inner surface 366 that is cylindrical. The cylindrical nature of the inner surface 366 can allow for the fluid to move easily through the rotary union 304. For example, the inner surface 366 of the inlet member 324 can form a conduit between the first end 362 and the second end 364. The first end 362 of the inlet member 324 can be designed to be coupled to or configured to receive an external fluid source using various fasteners, clamps, and fittings, including providing a threaded coupling for cooperating with a water source hose (not shown).

In certain embodiments, the inlet member 324 can be formed entirely from metal. As a non-limiting example, the metal can be brass. Advantageously, forming the inlet member 324 entirely from metal can increase the longevity of the inlet member 324 and militate against the inlet member 324 breaking when another hose or water supply line is connected or unconnected from the inlet member 324. One of ordinary skill in the art can select other suitable materials for the inlet member 324 within the scope of the present disclosure.

As shown in FIG. 14, the collar 332 can include a first edge 368, a second edge 370, a flange 372, and the recess 346. The first edge 368 can be configured to receive the inlet member 324. The second edge 370 can be configured to receive the outlet member 326 coupled to a hose 101. The inlet member 324 and the collar 332 can be formed separately. In certain embodiments, the inner diameter (D2) of the collar 332 can be substantially the same as the outer diameter (D3) of the second end 364 of the inlet member 324, such that the collar 332 can be slid over the first end 362 of the inlet member 324 and the collar 332 can snuggly fit on the inlet member 324.

With reference to FIG. 14, the second edge 370 of the collar 332 can be configured to be inserted into the second sidewall 110 of the hose reel enclosure 100. The recess 346 can sit directly inside the second sidewall 110 while the flange 372 can sit directly outside the second sidewall 110. The second aperture 113 can be recessed within the second sidewall 110. To this point, the collar 332 can be disposed entirely within the second aperture. As shown in FIG. 15, the second aperture 111 of the second sidewall 110 can include a border 113 that circumscribes the second aperture 11. The border can include a top border 115 and a bottom border 117. The top border 115 can be entirely disposed within a top border plane and the bottom border 117 can be entirely disposed within a bottom border plane. The top border plane and the bottom border plane can be parallel such that the top border 115 and the bottom border 117 are parallel. As described herein, the recess 346 of the collar 332 can be configured to receive the arm 342 of the securing member 330. Where the arm 342 is secured in the recess 346, the inlet locking collar assembly 328 can be secured to the second sidewall 110 of the enclosure 100. Advantageously, the secure hold can militate against the inlet locking collar assembly 328 rotating when in use on the enclosure 100.

The collar 332 can include the flange 372 disposed between the first edge 368 and the second edge 370. The flange 372 can include a notch 374 configured to receive the clip 344 of the securing member. The notch 374 can militate against the collar 332 and securing member 330 rotating as the hose reel assembly 300 is wound and unwound and create a more secure hold. The notch 374 can be sized substantially the same as the clip 344 to allow for the clip 344 to securely fit within the notch 374. A skilled artisan can select a suitable size for the notch 374 and clip 344 within the scope of the present disclosure.

As shown in FIG. 7, the flange 372 can include a top edge 376 and a bottom edge 378. The top edge 376 can be disposed entirely within a first plane and the bottom edge 378 can be disposed entirely within a second plane. The first plane and the second plane can be parallel. To this point, top edge 376 and the bottom edge 378 can be parallel on the flange 372. Additionally, as the entirety of the top edge 376 is disposed within the first plane, the top edge 376 of the flange 372 can be flat. Similarly, as the entirely of the bottom edge 378 is disposed within the second plane, the bottom edge 378 of the flange 372 is flat. With continued reference to FIG. 7, the flange 372 can nest within the second aperture 111 and be contained within the second aperture border 113. To this point, where the collar 332 is installed in the second aperture 111 of the second sidewall 110, the top edge 376 of the flange 372 can correspond with the top border 115 of the second aperture 111. Similarly, the where the collar 332 is installed in the second aperture 111 of the second sidewall 110, the bottom edge 378 of the flange 372 can correspond with the bottom border 117 of the second aperture 111. As such, the top border plane, the bottom border plane, the first plane, and the second plane can all be parallel with one another.

It should be appreciated that the top edge 376, the bottom edge 378, the top border 115, and the bottom border 117 all being disposed within parallel planes and, therefore, being flat surfaces, militates against the collar 332 from rotating with the rotation of the spool 302 and the outlet member 326. Should the collar 332 attempt to rotate, a corner of either the top edge 376 or the bottom edge 378, depending on direction of rotation, would collide with either of the top border 115 or bottom border 117, respectively, and militate against the collar 332 from moving. Should the second aperture 111 or the collar 332 be any shape that does not include at least two sides entirely disposed within parallel planes, the inlet member 324 and the collar 332 would rotate with the rotation of the spool 302 and the outlet member 326 and could result in the fluid source uncoupling from the inlet member 324 and could render the hose reel enclosure 100 useless.

The hose reel assembly 300 can also include the crank 306, as shown in FIG. 9. The crank 306 can rotate the hose reel assembly 300 within the unitary housing 102. To this point, the first bearing assembly 309 can extend through the first sidewall 106 to be coupled to the crank 306. Advantageously, the crank 306 can allow for the hose 101 to be manually wound and unwound from the hose reel enclosure 100 by the user. The crank 306 can include a handle 380 ergonomically shaped to allow the user to grasp the crank 306 for turning. A skilled artisan can select a suitable size and shape for the crank 306 and handle 380 within the scope of the present disclosure.

In operation, the user can couple a fluid source to the inlet member 324 of the rotary union 304 via a fluid supply line such as a hose 101. As described herein, the first end 362 of the inlet member 324 of the rotary union 304 can include threading complementary to a fluid source coupling or hookup (not shown) to couple the first end to a fluid source such as another hose or water supply line. The user can also couple a hose 101 to the second terminal 336 of the outlet member 326. In this way, a fluid connection between the fluid source, the fluid supply line, the rotary union 304, and the hose 101 is created such that the user can turn on the fluid source and the fluid will flow through to the hose 101. The user can use the crank 306 to wind the hose 101 upon the spool for storage and unwind the hose 101 from the spool 302 while in use. Advantageously, this spooling feature of the hose reel assembly 300 can allow for the hose to be wound upon and unwound from the hose reel enclosure 100 in an organized fashion, militating against kinks occurring in the hose and reduced water pressure while in use.

It should be appreciated that the hose reel enclosure 100 including the hose reel assembly 300, can allow the hose 101 to permanently remain in the enclosure for storage. The hose 101 can remain in the hose reel enclosure 100 during inclement weather and the hose reel enclosure 100 can provide protection from the elements. Further, the hose reel enclosure 100 can militate against hose 101 degradation from UV light by blocking sunlight from contacting the hose 101.

It should be noted that, in operation, the hose reel enclosure 100 can have a hose 101 disposed within. The hose reel enclosure 100 can be used with any type of hose 101 including vinyl hoses, rubber hoses, expandable hoses, as examples. A skilled artisan can select a suitable hose 101 for use with the hose reel enclosure 100 within the scope of the present disclosure.

It should be noted that the hose reel enclosure 100 can be a cube shaped container that tapers slightly toward the bottom portion 118 and can have a slatted appearance similar to that of a wood panel design. Any type of decorative pattern can be employed. The pattern can be integrally molded onto the front wall 104, the first sidewall 106, the rear wall 108, and the second sidewall 110. The top surface of the lid 132 can also include a decorative pattern formed thereon.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A hose reel enclosure for a hose, comprising:

a unitary housing including lateral supports and a front wall, a rear wall, a pair of side walls, and a groove integrally formed about a perimeter of the unitary housing, the lateral supports disposed within the groove, the lateral supports being integrally formed with the unitary housing and disposed on an exterior of the unitary housing;

a hose reel assembly disposed within the unitary housing and configured to receive the hose; and a hose guide including a pair of travel bars and a guide member, the hose guide disposed within the unitary housing and configured to receive a free end of the hose, each travel bar of the pair of travel bars is free standing and removable from the unitary housing, where each travel bar of the pair of travel bars spans from one side wall to another side wall behind the front wall.

2. The hose reel enclosure of claim 1, wherein the lateral supports are disposed along a bottom portion of the unitary housing.

3. The hose reel enclosure of claim 1, wherein the pair of side walls includes a first sidewall and a second sidewall, each of the first sidewall and the second sidewall include a pair of apertures.

4. The hose reel enclosure of claim 3, wherein each pair of apertures receives the pair of travel bars.

5. The hose reel enclosure of claim 4, wherein a guide member is slidably disposed on the pair of travel bars.

6. The hose reel enclosure of claim 1, wherein the unitary housing includes a front wall having an opening configured to receive a hose.

7. The hose reel enclosure of claim 1, wherein unitary housing includes feet.

8. The hose reel enclosure of claim 7, wherein the lateral supports are disposed between a first foot and a second foot.

9. The hose reel enclosure of claim 7, wherein the groove is disposed adjacent to the feet.

10. The hose reel enclosure of claim 1, wherein the lateral supports are disposed on an exterior of the unitary housing.

11. The hose reel enclosure of claim 1, further including a crank configured to rotate the hose reel assembly within the unitary housing.

12. The hose reel enclosure of claim 11, wherein the hose reel assembly includes a rotary union configured to be coupled to the hose.

13. The hose reel enclosure of claim 1, further including a lid.

14. The hose reel enclosure of claim 13, wherein the lid is hingedly connected to the unitary housing.

15. The hose reel enclosure of claim 1, with a hose wound upon the hose reel assembly.

16. The hose reel enclosure of claim 1, wherein the guide member is a unitary body having a contiguous and uninterrupted surface.

17. The hose reel enclosure of claim 1, wherein the unitary housing, the groove, and the lateral supports are formed from a continuous, homogeneous material as a single injection-molded piece.

18. The hose reel enclosure of claim 1, wherein the groove extends continuously about an entire perimeter of the unitary housing without interruption, and wherein each lateral support of the lateral supports is positioned to provide structural reinforcement to a corresponding wall of the unitary housing.

19. A hose reel enclosure for a hose, comprising:

a unitary housing including:

a front wall having an opening configured to receive the hose, a rear wall, and a pair of side walls, a groove integrally formed about a perimeter of the unitary housing, a plurality of lateral supports disposed within the groove, the lateral supports being integral to the unitary housing and disposed on an exterior of the unitary housing, feet disposed on the unitary housing below corners formed between the front wall and the rear wall and the pair of side walls;

a hose reel assembly disposed within the unitary housing, the hose reel assembly including:

a rotary union configured to be coupled to the hose, a crank disposed adjacent to the unitary housing and configured to rotate the rotary union;

a hose guide including a pair of travel bars and a guide member, the hose guide disposed within the unitary housing and configured to receive a free end of the hose, each travel bar of the pair of travel bars is free standing and removable from the unitary housing, where each travel bar of the pair of travel bars spans from one side wall to another side wall behind the front wall; and an inlet collar disposed within the unitary housing for coupling with a fluid source.

20. A hose reel enclosure for a hose, comprising:

a unitary housing including lateral supports and a front wall, a rear wall, a pair of side walls, and a groove integrally formed about a perimeter of the unitary housing, the lateral supports disposed within the groove, the lateral supports being integrally formed with the unitary housing and disposed on an exterior of the unitary housing;

a hose reel assembly disposed within the unitary housing and configured to receive the hose; and a hose guide including a pair of travel bars and a guide member, the hose guide disposed within the unitary housing and configured to receive a free end of the hose, each travel bar of the pair of travel bars is free standing and removable from each of the side walls of the unitary housing, where each travel bar of the pair of travel bars spans from one side wall to another side wall behind the front wall, each travel bar includes a cap disposed at a terminus of each travel bar extending through the side walls of the unitary housing to support the pair of travel bars.

* * * * *